Figure 5:
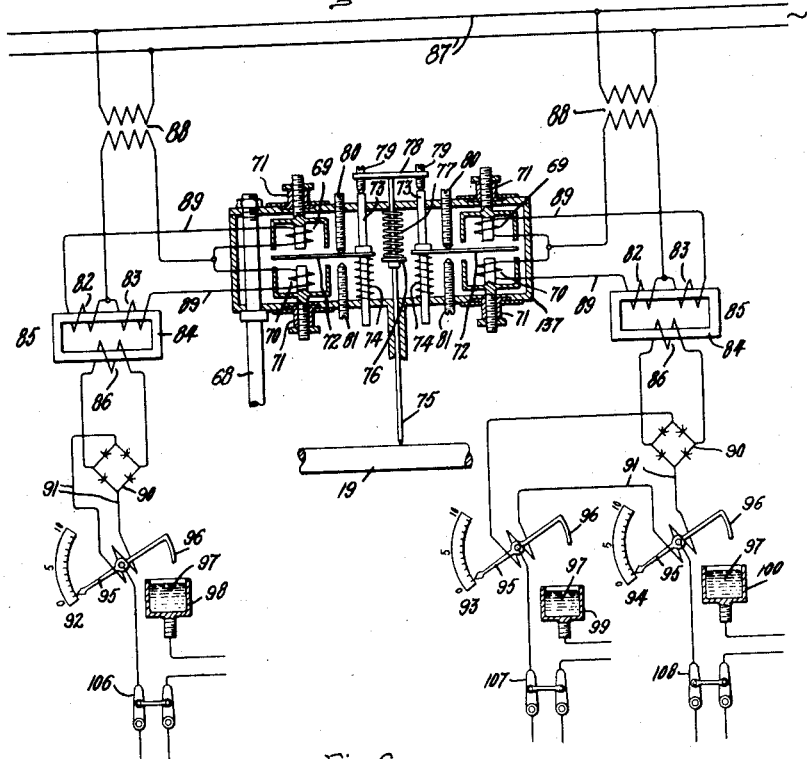

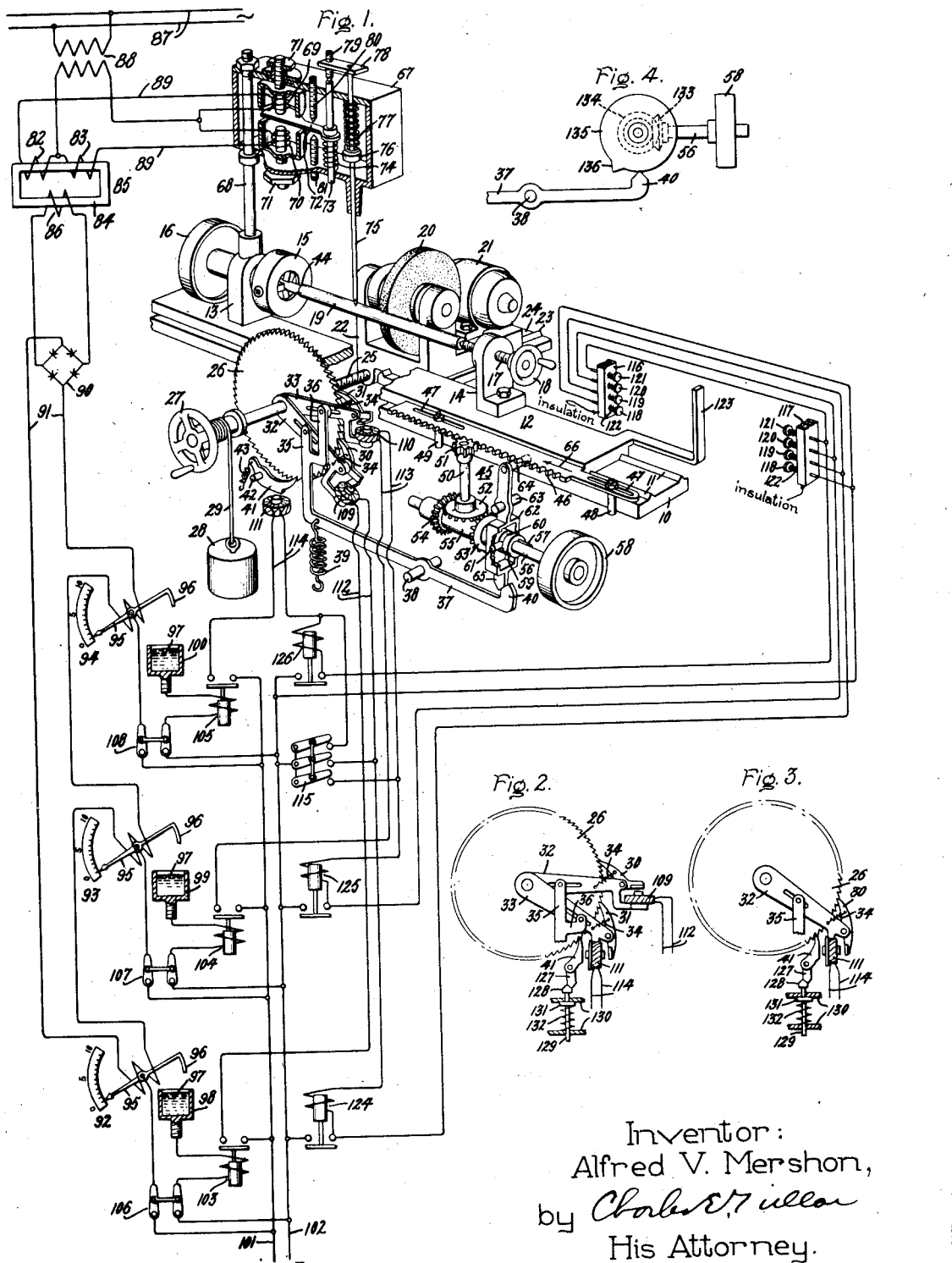

Sept. 27, 1932.  A. V. MERSHON  1,879,388
AUTOMATIC CONTROL OF FEEDING MECHANISM IN TOOL MACHINES
Filed Oct. 23, 1931    3 Sheets-Sheet 2

Inventor:
Alfred V. Mershon,
by Charles V. Muller
His Attorney.

Sept. 27, 1932.  A. V. MERSHON  1,879,388
AUTOMATIC CONTROL OF FEEDING MECHANISM IN TOOL MACHINES
Filed Oct. 23, 1931   3 Sheets-Sheet 3

Inventor:
Alfred V. Mershon,
by Charles E. Tullar
His Attorney.

Patented Sept. 27, 1932

1,879,388

UNITED STATES PATENT OFFICE

ALFRED V. MERSHON, OF SCHENECTADY, NEW YORK, ASSIGNOR TO GENERAL ELECTRIC COMPANY, A CORPORATION OF NEW YORK

AUTOMATIC CONTROL OF FEEDING MECHANISM IN TOOL MACHINES

Application filed October 23, 1931. Serial No. 570,688.

My invention relates to electrical apparatus for controlling the grinding feed mechanism of grinding machines, or the cutting feed mechanism of tool machines, such as lathes, boring mills, etc. The principal object of my invention is to provide an improved form of such apparatus as will enable grinding machines and tool machines automatically to grind or cut a work piece to within a fractional thousandth of an inch of a predetermined size. An additional object of my invention is to provide an apparatus which will enable grinding machines and tool machines automatically to reproduce with a very high degree of accuracy any number of work pieces having the size or shape of a selected sample. Further objects of my invention will be mentioned during the course of this specification.

The predominant use for electrical apparatus of the above mentioned character, is with precision machinery producing large quantities of similar work pieces which should be within a fractional thousandth of an inch of a predetermined size. Machinery of this type is used, for example, to grind the race balls for ball bearings and numerous parts used in electric refrigerators and internal combustion engines for automobiles and airplanes. Prior to my invention, numerous forms of electrically operated apparatus have been proposed for automatically controlling the grinding feed mechanism on grinding machines. The following brief description of the operating principle of the prior art apparatus will help to understand the necessity for and the advantages of my apparatus. So far as I know, the prior art apparatus employ one or more electromagnets for controlling the feeding mechanism, one or more pairs of contacts for controlling the energization of the electromagnets, and a movable gauging member in contact with the work piece for mechanically opening or closing the contacts, as the particular circuit requires, when the work piece is at the desired size. Obviously, it is of prime importance that the contacts should be closed or opened only when the work piece is at exactly the desired size. When the work piece is very nearly to the desired size, these contacts are nearly closed or nearly ready to open, and the vibration which is always present to some extent in the vicinity of grinding machines may cause premature closing or opening of the contacts, thus causing premature operation of the electromagnet, and hence resulting in the production of work pieces of erroneous size. In addition, a spark occurs every time the contacts are opened, and due to the frequent opening of the contacts the sparking may soon sufficiently corrode the contacts so that the opening or closing of the contacts occurs too early or too late, thus resulting in the production of work pieces of erroneous size.

It therefore became desirable to provide electrically operated apparatus in which the gauging member does not operate contacts, and yet this member effects operation of the electromagnet when the work piece is at exactly the desired size. My invention provides such an apparatus, and briefly described it consists in its simplest form of an electromagnet for controlling the grinding feed mechanism of the machine, a Wheatstone bridge energized by alternating current and having at least one coil connected in one of its arms, a magnetic member located adjacent to the coil to act as a part of its magnetic circuit, the coil and magnetic member being relatively movable and having their relative positions changed by a gauging member in contact with the work piece, thus varying the difference of potential across the bridge, caused by an unbalance thereof during the operation on the work piece. This difference of potential is then utilized for energizing electro-responsive means which are suitably adjusted to effect the energization of the electromagnet when the work piece is at exactly the desired size. By making both the coil and the magnetic armature of the Wheatstone bridge movable, or by suitably arranging two Wheatstone bridges, the machine can reproduce, with a very high degree of accuracy, any number of work pieces having the size or shape of a selected sample. Where, for example, a shaft is reciprocated past a grinding wheel during the grinding operation, I provide suitable control mechanism that permits the energization of the electromagnet to occur only at the end of a reciprocation, thus insuring the same diameter over the entire part of the shaft to be ground to a given diameter.

My invention, however, will be best understood from the following description when considered in connection with the accompanying drawings, while those features of my invention which are believed to be novel and patentable are pointed out in the appended claims.

Before proceeding with the description of my invention, I prefer to assist the description by first giving the following explanation of four of the most widely employed grinding methods. To assist this explanation, I assume the concrete example of the grinding of a shaft from 1.0300″ diameter to 1.0000″ diameter.

1.—The grinding is conducted with a uniform feeding rate of the grinding wheel toward the shaft till the diameter of the latter is, for example, 1.0100″, whereupon the feeding rate of the grinding wheel is automatically reduced; the grinding then continues till the shaft diameter is, for example, 1.0030″, whereupon the grinding feed is automatically shut off; the grinding wheel then remains in the position it had when the feed was shut off, and the grinding continues due to the pressure between the grinding wheel and the shaft, this grinding being often called "sparking out", and when the shaft diameter is 1.0000″, the grinding wheel is automatically retracted from the shaft. This method of grinding is usually employed when the very smooth shaft surface obtainable by "sparking out" is desired, and when the grinding feed rate is purposely reduced during the latter part of the grinding operation in order to decrease the pressure between the grinding wheel and the shaft and thus avoid a possible deflection of the shaft due to this pressure, thus insuring a straight ground shaft.

2.—The grinding is conducted with a uniform feeding rate till the shaft diameter is, for example, 1.0030″, whereupon the grinding feed is automatically shut off, the grinding wheel remains in the position it had when the feed was shut off, and the grinding continues by "sparking out" till the shaft diameter is 1.0000″, whereupon the grinding wheel is automatically retracted from the shaft. This method of grinding is usually employed when the very smooth shaft surface obtainable by "sparking out" is desired, and where the shaft material or its dimensions are such that there is no danger of deflecting the shaft during the grinding operation.

3.—The grinding is conducted with a uniform feeding rate till the shaft diameter is, for example, 1.0100″, whereupon the feeding rate is automatically reduced and the grinding continues till the shaft diameter is 1.0000″, whereupon the grinding wheel is automatically retracted from the shaft. This method of grinding is usually employed when it is desired to avoid a possible deflection of the shaft and where it is not essential to have the very smooth shaft surface obtainable by "sparking out".

4.—The grinding is conducted with a uniform feeding rate till the shaft diameter is 1.0000″, whereupon the grinding wheel is automatically retracted from the shaft. This method of grinding is usually employed when it is not essential to have the very smooth shaft surface obtainable by "sparking out", and where the shaft material or its dimensions are such that there is no danger of deflecting the shaft during the grinding operation.

Figure 6:
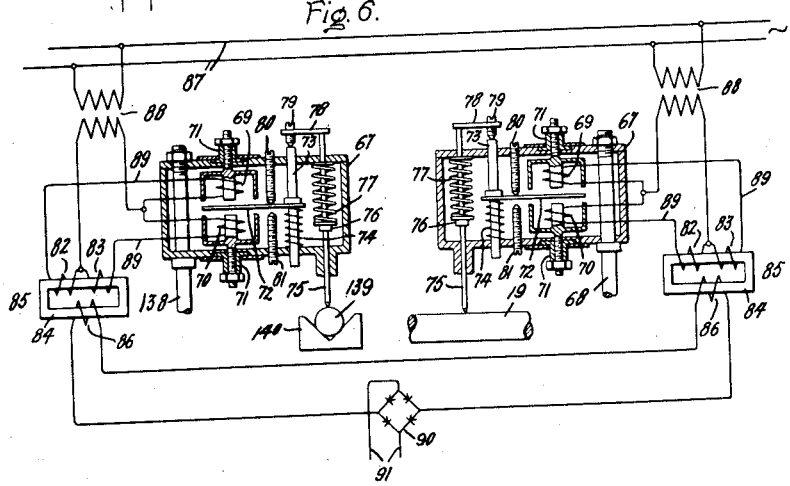
Figure 7:
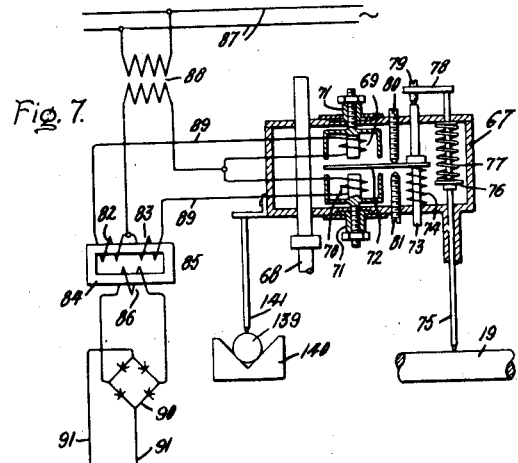
Figure 8:
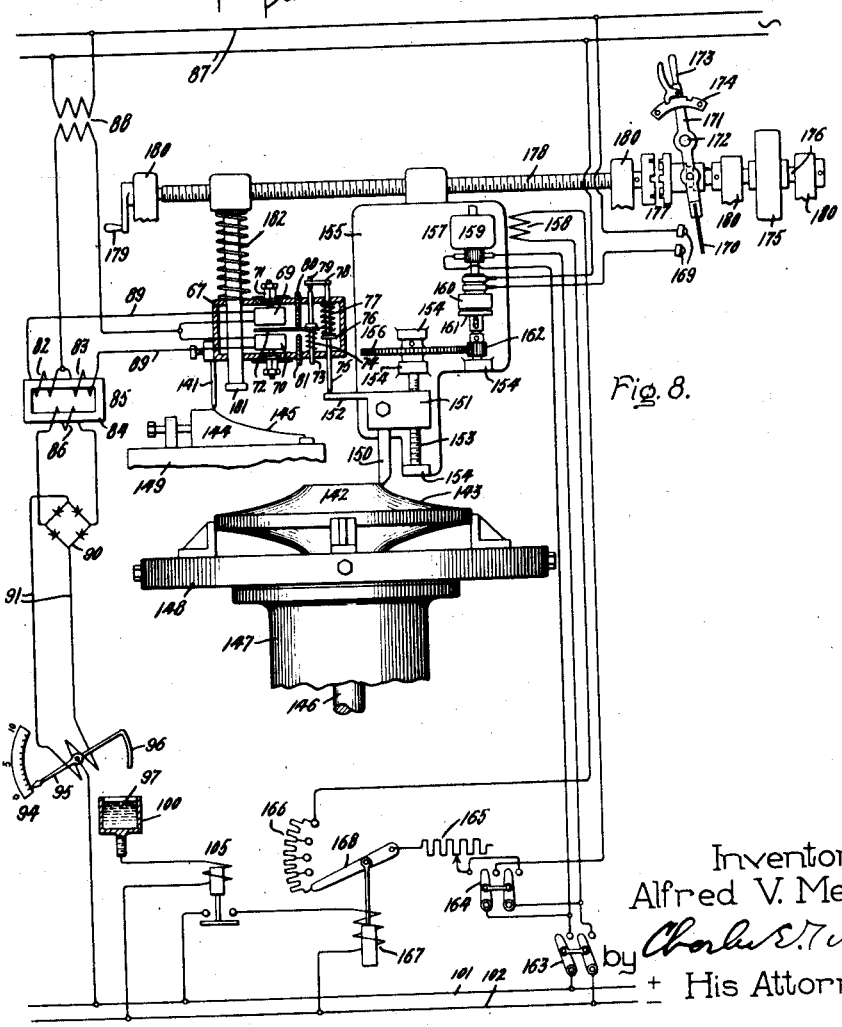

Referring to the drawings, Fig. 1 is a view, partly in perspective and partly in front elevation, of a preferred embodiment of my invention as applied to a grinding machine for grinding work pieces, such as a shaft, according to grinding methods 1 and 2. In this embodiment, I employ a single gauge head having two coils connected in two arms of a Wheatstone bridge and a movable magnetic armature between the coils actuated by the gauging member in contact with the shaft, and three electromagnets operatively associated with the grinding feed mechanism. Figs. 2 and 3 represent modifications of the electro-grinding feed mechanism and the electromagnets operatively associated therewith for use with the arrangement shown in Fig. 1 to effect the grinding of the shaft in accordance with methods 3 and 4, respectively. Fig. 4 represents a modification of the driving means shown in Fig. 1 for driving the grinding feed mechanism. Fig. 5 is a view, in front elevation, of a modification of a portion of the electrical control apparatus shown in Fig. 1, this modification employing two gauge heads whose two movable magnetic armatures are actuated by the gauging member in contact with the shaft being ground. Fig. 6 is a view, in front elevation, of a modification of my invention as applied to the automatic grinding of a shaft to the diameter of a selected sample, this modification employing two gauge heads. Fig. 7 is a view, in front elevation, of a modification of Fig. 6, employing one gauge head. Fig. 8 is a view, in front elevation, of a modification of my invention as applied to the automatic machining of a work piece to the contour of a selected sample, one gauge head being employed as in Fig. 7. Similar parts in the various figures are represented by the same reference numerals.

Referring to Fig. 1, I will first describe the grinding machine. A stationary plate 10 having V-shaped ways 11 is secured to or is integral with the grinding machine base (not shown). Slidably mounted on ways 11 is a work table 12 to which is secured a headstock 13 and a tailstock 14. The headstock 13 carries work holding means, such as a chuck 15, secured to a rotatable pulley 16 which is driven by any suitable means. A live center (not shown) rotates with chuck 15. A dead center 17 is threaded into tailstock 14 and is secured to a hand wheel 18. A work piece, represented as a shaft 19, has one end centered to engage the live center (not shown) and is also gripped by the chuck 15, and the other end is centered to engage the dead center 17. A grinding wheel 20 is driven by an electric motor 21, and both are mounted on a carriage 22 which is slidably mounted on V-shaped ways 23 of a stationary plate 24. The ways 23 are transverse of the ways 11 so that movement of carriage 22 brings grinding wheel 20 toward or from the surface of shaft 19. For moving carriage 22, there is provided a grinding feed mechanism comprising a left-hand screw 25 which is threaded into carriage 22 and is secured to a ratchet wheel 26. The front end of screw 25 is also secured to a hand wheel 27 so that when desired the grinding wheel 20 may be moved manually toward or from shaft 19. A weight 28 is secured to a cord 29 which is wound on the threadless enlarged front end of screw 25 and is secured thereto, the object of the weight being explained later. For automatically moving grinding wheel 20 toward shaft 19, there are provided two pawls 30 and 31 pivotally mounted on arms 32 and 33, respectively, and held against the teeth of ratchet 26 by springs 34 placed between the arms and pawls. Arms 32 and 33 are adapted to rotate on the threadless portion of screw 25 and to be rotated by upwardly extending arms 35 and 36, respectively, the latter being an integral part of a lever 37 pivotally mounted on a stationary pin 38 secured to the base. A helical tension spring 39 is secured to the base and to the left-hand end of lever 37 so as to exert a downward pull on the latter. The right-hand end of lever 37 has an upwardly extending bevel shaped projection 40. It is clearly seen from the figure, that if projection 40 is depressed from its illustrated position by some force, the arms 32 and 33 will rotate counter-clockwise, and arm 32 will move through a larger angle than arm 33, because the distance from the center of screw 25 to the driving connection between arm 32 and arm 35 is less than the distance from the center of screw 25 to the driving connection between arm 33 and arm 36. It follows, that if projection 40 is depressed with pawls 30 and 31 bearing against the teeth of ratchet 26, the latter will be rotated the maximum amount since it will be moved by pawl 30, while pawl 31 slips over the ratchet teeth an amount corresponding to the difference between the angular motions of arms 32 and 33, whereas if by some means pawl 30 is lifted off the ratchet teeth and projection 40 is depressed, the ratchet 26 will be moved the minimum amount since it will be moved by pawl 31. In both cases, ratchet 26 will be rotated counter-clockwise, and every time projection 40 is depressed the weight 28 is lifted and the grinding wheel 20 moved toward shaft 19 the maximum or minimum amount, depending on whether pawl 30 or 31 moves ratchet 26. When the force depressing projection 40 is removed, the spring 39 pulls arms 32 and 33, and hence pawls 30 and 31, downward to a position fixed by the limit of upward travel of projection 40, this upward limited travel of projection 40 being explained later. During the downward movement of pawls 30 and 31, a retaining pawl 41 which is pivoted on a stationary pin 42 and is held against the teeth of ratchet 26 by a tension spring 43 prevents ratchet 26 from being rotated clockwise by weight 28.

I will first assume that shaft 19 is to be ground to have the same diameter from the end where it rests in center 17 to its shoulder 44. As clearly shown, the length to be ground is much greater than the width of the grinding face of wheel 20, thus requiring that either shaft 19 or wheel 20 be reciprocated the required working stroke to grind this length. For illustrative purposes, I assume that shaft 19 is to be reciprocated relatively to wheel 20. For automatic grinding, it is therefore necessary to provide a driving mechanism for automatically reciprocating work table 12 the required working stroke and depress projection 40 at the end of each reciprocation. This mechanism is represented generally by 45, and comprises a rack 46 secured to or integral with table 12, the rack having slots 47 in which are adjustably mounted pins 48 and 49. A shaft 50 has secured to its upper end a pinion 51 in mesh with rack 46, and to its lower end is secured a bevel gear 52 adapted to mesh with either of bevel gears 53 and 54 which are secured to or are an integral part of a spindle 55, the bevel gears 53 and 54 being suitably spaced apart so that both cannot simultaneously mesh with gear 52. The spindle 55 is slidably mounted on a splined shaft 56 and is rotatable therewith because of a key 57 placed between them. The shaft 56 is secured to a pulley 58 which is driven by any suitable means. The spindle 55 has a hub 59 provided with a circular slot 60 in which slides a pin 61 which is secured to an arm 62 pivoted on a stationary pin 63. To the upper end of arm 62 is secured a pin 64 in the path of travel of pins 48 and 49, and at the lower end of arm 62 is a bevel shaped projection 65 in engagement with projection 40. The shafts 50 and 56 are supported in stationary bearings (not shown). Gear 53 is shown at present in mesh with gear 52, and it is assumed that pulley 58 is driven in such a direction that table 12 is now moving in the direction indicated by arrow 66. By suitably adjusting the position of pin 48, the latter hits and moves pin 64 to the left slightly after the end of shaft 19 at dead center 17 reaches the grinding face of wheel 20. The moving of pin 64 to the left causes the sliding of spindle 55 to the right, thus moving gear 53 out of mesh with gear 52 and moving gear 54 into mesh with gear 52, and at the same time moving projection 65 from the left to the right hand side of projection 40, thus depressing the latter during this movement. The spring 39 keeps the surfaces of projections 40 and 65 in contact at all times and returns projection 40 to its upper position as limited by the bevel face of projection 65. The meshing of gears 52 and 54 reverses the direction of movement of table 12, and the depressing of projection 40 advances wheel 20 toward shaft 19 in the manner hereinbefore explained. By suitably adjusting the position of pin 49, the latter hits and moves pin 64 to the right slightly after shoulder 44 of shaft 19 reaches the grinding face of wheel 20. The moving of pin 64 to the right moves gear 54 out of mesh with gear 52 and brings gears 52 and 53 again into mesh, thus reversing the direction of movement of table 12, and also moves projection 65 back to the left hand side of projection 40, thus depressing the latter and again advancing wheel 20 toward shaft 19. In the above described manner, the work table 12 is reciprocated back and forth and grinding wheel 20 is advanced a predetermined amount toward shaft 19 at the end of each reciprocation of table 12.

I will now describe the electrical apparatus illustrated in Fig. 1 for controlling the grinding feed mechanism. The single gauge head comprises a casing 67 which is adjustably secured to a post 68 mounted on headstock 13. Two spaced apart oppositely disposed coils 69 and 70, preferably provided with magnetic cores, are adjustably secured inside of casing 67. The positions of coils 69 and 70 may be changed by turning nuts 71. Between the adjacent ends of coils 69 and 70, and acting as a part of their magnetic circuits, is an armature 72 made of magnetic material and secured to a rod 73 which is slidably mounted in casing 67. A helical compression spring 74 between a lower wall of casing 67 and armature 72 continually urges the latter upward. Slidably mounted in casing 67 is a gauging rod 75 having a collar 76 with a helical compression spring 77 between the collar and upper wall of casing 67. The spring 77 is slightly more powerful than spring 74, thus always retaining the lower end of rod 75 against the periphery of shaft 19. The lower end of rod 75 bearing against the surface of shaft 19 is either hardened to resist wear or carries a wear-resisting element, such as a small diamond. The upper end of rod 75 is secured to a plate 78 into which is threaded an adjustable screw 79 which is adapted during its travel to abut against the top end of rod 73. Two adjustable screws 80 and 81 are threaded into casing 67 to be in the path of movement of armature 72 so as to limit the upper and lower positions of the latter if this is desired. Coils 69 and 70 are connected in two arms of a Wheatstone bridge, the other two arms consisting of two primary windings 82 and 83 oppositely wound on a magnetic core 84 of a transformer 85 having a secondary winding 86. An alternating current source 87 energizes the bridge circuit through a transformer 88. The coils 69 and 70 are practically duplicates of each other with respect to number of turns, size of wire, etc., and the same is true of primary windings 82 and 83. It is clear that when armature 72 is substantially central between the adjacent ends of coils 69 and 70, the bridge will be balanced and the currents in primary windings 82 and 83 will be substantially equal, and hence substantially no voltage will be induced in secondary winding 86. If armature 72 is moved from the above described position, the bridge will become unbalanced and the voltage induced in secondary winding 86 will be substantially directly proportional to the difference of potential across the bridge, due to this unbalance. I prefer to obtain the unbalanced bridge voltage inductively as described, but it is obvious that I can also obtain this voltage conductively from leads 89. The secondary 86 is connected to a suitable full wave rectifier 90, to which are connected leads 91, and it is clear that the direct current voltage between leads 91 will also be substantially directly proportional to the difference of potential across the bridge, due to an unbalance thereof.

The voltage between leads 91 may be employed to energize any suitable apparatus for controlling the grinding feed mechanism, and I therefore wish it clearly understood that my invention is not to be limited to the apparatus I am about to describe, since the latter is only illustrative of one form of apparatus that may be used. I prefer to impress the voltage between leads 91 on three series-connected micro-ammeters 92, 93 and 94 having indicating needles 95 provided with metallic arms 96 adapted during their movement to make contact with an electrically conducting fluid 97, such as mercury, contained in adjustably mounted metallic cups 98, 99 and 100, respectively. The above arrangement really constitutes three relays. A direct current source is represented by lines 101 and 102. Line 101 is connected to movable arms 95, and line 102 is connected to one end of the coils of relays 103, 104 and 105, the other ends of these coils being connected to cups 98, 99 and 100, respectively, switches 106, 107 and 108 being interposed as shown. Cup 98 is adjusted so that the arm 96 of micro-ammeter 92 makes contact with the mercury in this cup and thus effects the energization of relay 103, when the indicating needle of 92 indicates 6, for example. In a similar manner, cups 99 and 100 are adjusted so that the energization of relays 104 and 105 are effected when the respective indicating needles of micro-ammeters 93 and 94 indicate, for example, 8 and 9, respectively. Secured to a projection of arm 32 of the grinding feed mechanism is an electromagnet 109 adapted when energized to attract a projection secured to pawl 30 and thus pull the latter away from the teeth of ratchet 26. Secured to a projection of arm 33 is an electromagnet 110 adapted when energized to attract a projection secured to pawl 31 and thus pull the latter away from the teeth of ratchet 26. An electromagnet 111 is suitably positioned so that when energized it pulls pawl 41 away from the teeth of ratchet 26. Leads 112, 113 and 114 from the electromagnets 109, 110 and 111, respectively, are so connected to lines 101 and 102, that with switch 115 closed, the electromagnet 109 becomes energized immediately upon the closing of the contacts of relay 103, the electromagnet 110 becomes energized immediately upon the closing of the contacts of relay 104, and the electromagnet 111 becomes energized immediately upon the closing of the contacts of relay 105.

The object of electromagnet 109 is to effect a reduction in the rate of feeding movement of wheel 20 toward shaft 19 when the latter has been ground a predetermined amount; the object of electromagnet 110 is to effect cessation of the feeding movement when shaft 19 has been further ground a predetermined amount; and the object of electromagnet 111 is to effect the retraction of wheel 20 from shaft 19 when the latter has been ground to exactly the desired diameter. The gauging rod 75, however, touches only one point of shaft 19, and if the electromagnets become immediately energized when wheel 20 reduces the shaft part in contact with rod 75 to the sizes at which the electromagnets are to operate, then their respective functions will be performed with shaft 19 having one diameter to the right of rod 75 and another diameter to the left of rod 75. It is desirable to avoid this when reducing or stopping the feeding movement of wheel 20 toward shaft 19, but it is absolutely necessary to avoid this when retracting wheel 20 from shaft 19 if the latter is to be ground to a uniform diameter. It is, therefore, desirable to provide a mechanism which will prevent these objectionable results, and the provision of such mechanism is an additional object of my invention. A description of this mechanism follows. Two blocks of insulating material 116 and 117 are adjustably mounted on some stationary part of the machine. In each block there are four slidably mounted metallic rods having at one end thereof contacts 118, 119, 120 and 121, respectively. Compression springs 122 are placed between each contact and the adjacent face of its block. Work table 12 has an upwardly extending metallic arm 123 in the same plane as the contacts on the blocks. The position of block 116 is so adjusted that when table 12 is moving to the left, arm 123 touches the contacts on this block just before pin 48 hits pin 64 to cause reversal of movement of the table, and the position of block 117 is so adjusted that when table 12 is moving to the right, arm 123 touches the contacts on this block just before pin 49 hits pin 64 to cause reversal of movement of the table, and springs 122 on each block are of such length that they are not entirely compressed when the table reaches either extreme position, thus avoiding damage to the blocks and contacts. The two contacts 118 are connected in parallel to the line 102, the two contacts 119 are connected in parallel to one contact of a relay 124, the two contacts 120 are connected in parallel to one contact of a relay 125, and the two contacts 121 are connected in parallel to one contact of a relay 126. The connections between these relays, lines 101 and 102, and the electromagnets are obvious and need no description. With switch 115 open, it can be seen that electromagnet 109 will become energized when the contacts of relay 103 are closed and arm 123 has moved to the left or right to touch the contacts on block 116 or 117, thus completing the circuit from line 101, through contacts of relay 103, electromagnet 109, coil of relay 124, and one of the pairs of contacts 118 and 119, to line 102. But the current flow through relay 124 causes it to close its contacts, thus short-circuiting contacts 118 and 119 and providing a direct path from electromagnet 109 to line 102. It is seen that once relay 103 is energized and arm 123 touches a pair of contacts 118 and 119 on block 116 or 117, the electromagnet 109 becomes energized and remains energized as long as relay 103 remains energized, even though arm 123 subsequently moves away from these contacts. In a similar manner, once relay 104 is energized and arm 123 touches a pair of contacts 118 and 120 on block 116 or 117, the electromagnet 110 becomes energized and remains energized as long as relay 104 remains energized, even though arm 123 subsequently moves away from these contacts. Also, once relay 105 is energized and arm 123 touches a pair of contacts 118 and 121 on block 116 or 117, the electromagnet 111 becomes energized and remains energized as long as relay 105 remains energized, even though arm 123 subsequently moves away from these contacts.

I will now give a description of the automatic grinding operation. I will assume that shaft 19 has a diameter of 1.0300" from its shoulder 44 to its end at dead center 17, and that it is desired to grind the shaft to a diameter of 1.0000". A sample shaft with a diameter of 1.0000" is first placed between the dead and live centers of the machine in place of shaft 19. The relative positions of coils 69 and 70 and armature 72 are adjusted by nuts 71 and the screw 79, so that with the lower end of the gauging member in contact with the surface of the sample shaft, the Wheatstone bridge is unbalanced to the extent of causing the indicating needle of micro-ammeter 94 to indicate exactly 9, and the indicating needles of micro-ammeters 93 and 82 to indicate approximately 9. This adjustment is also made so that upward movement of armature 72 from this adjusted position decreases the unbalanced voltage of the bridge and thus decreases the indications of the micro-ammeters. The sample shaft is removed and shaft 19 inserted in its place. As the shafts are being interchanged, there is a period during which neither shaft is in place. During this period the gauging member 75 tends to move downward until armature 72 touches the top of coil 70, thus increasing the unbalanced voltage of the bridge and increasing the current flow through the micro-ammeters to an extent depending on the downward movement of armature 72 from its adjusted position. This may be prevented by adjusting screw 81 so that armature 72 abuts against the screw when the micro-ammeters indicate 10 or slightly higher. When shaft 19 is inserted, the gauging member 75, and hence armature 72, move upward .015" from the adjusted position. It is clear that an upward movement of armature 72 from its adjusted position will first cause a decrease of the unbalanced bridge voltage to zero, and then cause an increasing unbalanced bridge voltage in the relatively opposite sense, thus first decreasing the indications of the micro-ammeters to zero and then causing them to give increasing indications. Ordinarily, this upward movement of .015" of armature 72 from its adjusted position will bring the indications of the micro-ammeters to about zero, but if this movement, or a larger movement caused by inserting a shaft 19 having a diameter over 1.0300", causes the indications of the micro-ammeters to go through zero and then up to an indication which might interfere with the proper operation of the apparatus, then this may be prevented by adjusting screw 80 so that armature 72 abuts against the screw when the micro-ammeters indicate approximately zero. The screw 79 will then not touch the top of rod 73, but as the shaft 19 is being ground and before it reaches the diameter at which the first electromagnet on the grinding feed mechanism is to operate, the screw 79 will abut against the top of rod 73 and move armature 72 during the remainder of the grinding operation. The grinding operation may now be commenced, it being of course understood that the above described adjustments need be made only once for grinding the shaft to a given diameter and any number of shafts may thereafter be ground with the same adjustments. As previously described, the work table 12 is automatically reciprocated back and forth during the grinding operation, and at the end of each reciprocation of table 12, the grinding wheel 20 is automatically advanced toward shaft 19 by pawl 30. The lower end of rod 75 is kept continually in contact with the surface of shaft 19 as the latter is being ground by wheel 20, and hence armature 72 moves downward toward its adjusted position the amount that wheel 20 is advanced toward shaft 19. This downward movement of armature 72 increases the unbalanced bridge voltage and causes micro-ammeters 92, 93 and 94 to give increasing indications. Assume work table 12 moving in the direction indicated by arrow 66, and wheel 20 grinding shaft 19 to a diameter of 1.0100". When the surface of shaft 19 in contact with rod 75 passes the grinding wheel, the armature 72 assumes a position corresponding to this diameter, and I assume that this position corresponds to an indication of 6 on the micro-ammeter, thus causing arm 96 of micro-ammeter 92 to make contact with the mercury in cup 98. This effects the energization of relay 103 which closes its contacts, but the electromagnet 109 is not immediately energized, because switch 115 is open. When table 12 has moved so that the end of shaft 19 at dead center 17 has reached the grinding face of wheel 20, the arm 123 touches the contacts on block 116, thus short-circuiting contacts 118 and 119 and effecting the energization of electromagnet 109, which pulls pawl 30 off the teeth of ratchet 26. Table 12 moves a slightly further amount in the same direction till pin 48 hits and moves pin 64, thus reversing the direction of movement of table 12 and depressing projection 40 which moves arms 32 and 33 counter-clockwise. Since arm 32 carries both the electromagnet 109 and pawl 30, therefore, so long as the former is energized it continues to keep the latter away from the teeth of ratchet 26 whether arm 32 is stationary or is moving, and, due to the action of relay 124, the electromagnet 109 remains energized as long as relay 103 remains energized. It is clear that the depression of projection 40 now causes ratchet 26 to be moved by pawl 31 and hence wheel 20 is moved toward shaft 19 a lesser amount than previously, and the result would be the same if table 12 happened to be moving in the opposite direction when wheel 20 was grinding shaft 19 to a diameter of 1.0100″. The grinding now continues with a reduced grinding feed. I will assume that when the surface of shaft 19 in contact with rod 75 passes wheel 20 and is ground to a diameter of 1.0030″, the position of armature 72 is such that the micro-ammeters indicate 8, thus causing arm 96 of micro-ammeter 93 to make contact with the mercury in cup 99 and effect the energization of relay 104. When table 12 has moved so that arm 123 short circuits contacts 118 and 120 on block 116 or 117, the electromagnet 110 becomes energized and pulls pawl 31 away from the teeth of ratchet 26. The electromagnet 110 remains energized, due to the operation of relay 125, thus effecting a cessation of the grinding feed. The grinding now continues by "sparking out". When the surface of shaft 19 in contact with rod 75 passes wheel 20 and is ground to a diameter of 1.0000″, the position of armature 72 is such that micro-ammeter 94 indicates 9, thus causing arm 96 of micro-ammeter 94 to make contact with the mercury in cup 100 and effect the energization of relay 105. When table 12 has moved so that arm 123 short circuits contacts 118 and 121 on block 116 or 117, the electromagnet 111 becomes energized and remains energized due to the operation of relay 126, thus pulling pawl 41 away from the teeth of ratchet 26, whereupon weight 28 rotates ratchet 26 clockwise, thereby retracting wheel 20 from shaft 19, and the grinding operation of shaft 19 is completed. From the foregoing description it will be seen that shaft 19 was ground to a uniform diameter according to #1 grinding method.

For grinding according to #2 grinding method, pawl 30 or 31 should be made inoperative or omitted during the entire grinding operation, and I will assume that pawl 31 is omitted. Cup 98 should be so adjusted that when micro-ammeter 92 indicates 8 its arm 96 just touches the mercury in this cup. The grinding operation may be conducted with switch 107 open. At the end of each reciprocation of work table 12 during the grinding operation, the wheel 20 will be advanced toward shaft 19 by pawl 30 till the shaft is reduced to 1.0030″ diameter, whereupon electromagnet 109 will become energized and effect cessation of the grinding feed. The grinding now continues by "sparking out" and when the shaft is ground to 1.0000″ diameter, the electromagnet 111 is energized and wheel 20 is retracted from shaft 19.

For grinding according to #3 grinding method, pawls 31 and 41 should be simultaneously pulled away from the teeth or ratchet 26 when the grinding operation is completed. This may be accomplished by slightly rearranging some of the grinding feed parts in the manner shown in Fig. 2.

In Fig. 2, arm 32 carries electromagnet 109 as before, but arm 33 now carries electromagnet 111 and is placed below arm 32 instead of above. Pawl 41 is so positioned that it can be attracted by electromagnet 111 when arm 33 is in its lowered position, which corresponds to the undepressed position of projection 40 (Fig. 1). To pawl 41 is secured a projection 127 having a bevel-faced end bearing against a bevel-faced projection 128 which is secured to a rod 129 slidably mounted in stationary plates 130. Rod 129 has a collar 131, and a helical compression spring 132 is placed between collar 131 and lower plate 130. With projection 127 on the right hand side of projection 128, the pawl 41 is retained against the teeth of ratchet 26. Cup 98 should be adjusted so that when micro-ammeter 92 indicates 6 its arm 96 just touches the mercury in this cup. The grinding operation may be conducted with switch 107 open. The grinding wheel 20 will be advanced by pawl 30 at the end of each reciprocation of work table 12 till the shaft is ground to 1.0100″ diameter, whereupon electromagnet 109 will become energized, and grinding wheel 20 will then be advanced by pawl 31 at the end of each reciprocation of table 12 till the shaft is ground to 1.0000″ diameter, whereupon electromagnet 111 will become energized and simultaneously pull pawls 31 and 41 away from the teeth of ratchet 26. When pawl 41 is attracted to electromagnet 111, the projection 127 is moved to the left hand side of projection 128, thus keeping pawl 41 away from the teeth of ratchet 26 even though arm 33 and electromagnet 111 are afterward moved upward by the depression of projection 40 (Fig. 1). The energization of electromagnet 111, therefore, simultaneously effects a cessation of the grinding feed and permits weight 28 (Fig. 1) to retract wheel 20 from shaft 19.

For grinding according to #4 grinding method, pawl 30 or 31 should be made inoperative or omitted during the entire grinding operation, and I will assume that pawl 31 is omitted. The remaining pawl 30 and pawl 41 should be simultaneously pulled away from the teeth of ratchet 26 when the grinding operation is completed. This is accomplished by slightly rearranging some of the grinding feed parts in the manner shown in Fig. 3. In Fig. 3, arm 32 is shown in the same position as in Fig. 1, and arm 33 is omitted to simplify Fig. 3. In Fig. 3, electromagnet 111 is carried by arm 32 and pawl 41 is arranged as in Fig. 2. The grinding operation may be conducted with switches 106 and 107 open. The grinding wheel 20 will be advanced by pawl 30 at the end of each reciprocation of table 12 till shaft 19 is ground to 1.0000″ diameter, whereupon electromagnet 111 will become energized and simultaneously pull pawls 30 and 41 away from the teeth of ratchet 26, thus effecting a cessation of the grinding feed and permitting weight 28 to retract wheel 20 from shaft 19.

When it is desired to grind different parts of shaft 19 to the same or different diameters, each part being not longer than the width of the grinding face of wheel 20, or when it is desired to grind single pieces shorter than the grinding face, then work table 12 need not and ordinarily will not be reciprocated. The driving mechanism shown in Fig. 4 may then be substituted for the driving mechanism 45 in Fig. 1. In Fig. 4, the pulley 58 drives a bevel gear 133 which meshes with a similar bevel gear 134 secured to a plate 135 which is of circular shape except for its projection 136. During every revolution of plate 135 the projection 136 depresses projection 40, and by driving pulley 58 at the proper speed the arms 35 and 36 (Fig. 1) will be raised and lowered at any desired frequency. Since the part now being ground has at any instant the same diameter over its entire length, therefore, the grinding should be conducted with switch 115 closed, so that if, for example, #1 grinding method is employed, the electromagnet 109 will become energized immediately when the diameter is reduced to 1.0100", the electromagnet 110 will become energized immediately when the diameter is reduced to 1.0030", and the electromagnet 111 will become energized immediately when the diameter is reduced to 1.0000". It is obvious that the other grinding methods may be employed when using the mechanism shown in Fig. 4.

In Fig. 5, I illustrate a double gauge head comprising a casing 137 containing two sets of coils 69 and 70, each set connected in a separate Wheatstone bridge circuit as shown. The left-hand Wheatstone bridge circuit controls micro-ammeter 92, and the right-hand Wheatstone bridge circuit controls micro-ammeters 93 and 94. The gauging member 75 moves both armatures 72. The remainder of the apparatus and the electrical connections are identical to those shown in Fig. 1. From the description given with Fig. 1, it will be obvious that by suitably adjusting the relative positions of the coils 69 and 70 and armatures 72, and adjusting the positions of cups 98, 99 and 100, the shaft 19 can be ground according to any of the methods described. By employing two Wheatstone bridge circuits, it is possible to adjust the relative positions of the coils and armature of the left-hand circuit so that the maximum variation in voltage across left-hand leads 89 for a given movement of gauging member 75 occurs just before arm 96 of micro-ammeter 92 makes contact with the mercury in cup 98, and the same is possible with the right-hand circuit and micro-ammeters 93 and 94. This gives both selective control of the electromagnets respectively controlled by the two Wheatstone bridge circuits and very high grinding accuracy, and that is why it is often desirable to use the double gauge head instead of the single gauge head shown in Fig. 1.

In the single and double gauge heads shown in Figs. 1 and 5, respectively, the relative positions of the coils and armature are adjusted with a sample shaft, after which any number of shafts 19 may be ground to the diameter of the sample shaft. If, however, the ambient temperature at the grinding machine when grinding shaft 19 is appreciably different from that when the adjustment was made with the sample shaft, then shaft 19 will not be ground to the diameter of the sample shaft, and likewise, if the ambient temperature varies as a plurality of shafts 19 are consecutively ground, the shafts will vary in diameter from each other. In most cases, however, the above method of adjustment is satisfactory because the changes in ambient temperature are comparatively small and the consequent variations in diameter of shafts 19 from the sample shaft may be neglected. There are cases, however, where it is very desirable to grind any number of pieces to the diameter of the sample shaft irrespective of changes in ambient temperature. The arrangement shown in Fig. 6 will accomplish this result. In this figure, I employ two similar single gauge heads. The right-hand gauge head is mounted the same as in Fig. 1. The left-hand gauge head has its casing 67 adjustably secured to a post 138 fastened to some stationary part in the near vicinity of the grinding machine, and has its gauging member 75 in contact with the surface of a sample shaft 139 resting in a stationary V-shaped block 140. The two transformer secondary windings 86 are connected in series with their voltages either aiding or opposing each other. The remainder of the apparatus and the electrical connections are identical to those shown in Fig. 1. From the description given in connection with Fig. 1, it will be obvious that by suitably adjusting the relative positions of the coils and armature in one or both gauge heads, and adjusting the positions of cups 98, 99 and 100, the shaft 19 can be ground according to any of the methods described. Changes in ambient temperature similarly affect shaft 19 and sample shaft 139, and it is therefore obvious that now any number of shafts 19 can be ground to the diameter of the sample shaft 139 irrespective of variations in the ambient temperature. When it is desired to grind one or more shafts 19 to the diameter of a sample shaft having a diameter different from that of sample shaft 139, it is unnecessary to readjust the coils and armatures in the gauge heads; it is only necessary to substitute the other sample shaft in place of sample shaft 139, thus securing the additional advantage of avoiding a loss of time when it is desired to change the finished diameter of the parts being ground.

Fig. 7 is a modification of Fig. 6, employing only one gauge head. In Fig. 7, the casing 67 is slidably mounted on the post 68 secured to headstock 13 (Fig. 1). To the casing 67 is secured a gauging rod 141 whose lower end rests on the surface of the sample shaft 139 lying in block 140. The remainder of the apparatus and the electrical connections are identical to those shown in Fig. 1. From the description given in connection with Figs. 1 and 6, it will be obvious that by suitably adjusting the relative positions of the coils and armature in the gauge head shown in Fig. 7, and adjusting the positions of cups 98, 99 and 100, it will be possible to reproduce the results obtainable with the two gauge heads shown in Fig. 6.

In Fig. 8, I show for illustrative purposes, a turbine wheel 142 having a web 143 and a templet 144 having a surface 145. I will assume that web 143 has been rough machined to approximately the proper shape and now it is desired to machine the web to a smooth finish with substantially the same contour as surface 145. A shaft 146 protruding through a stationary bed 147 is secured to a table 148 to which wheel 142 is clamped by suitable means. Shaft 146 is rotated by any suitable means, thus rotating wheel 142. Templet 144 is clamped to a stationary plate 149, although it is more convenient to have the position of the latter adjustable. A cutting tool 150 is clamped to a tool holder 151 having an outwardly projecting arm 152. The holder 151 has an internal thread engaging a screw 153 journaled in bearings 154 which are secured to a plate 155. To the upper end of screw 153 is secured a gear 156 whose opposite hubs fits snugly between the two top bearings 154. It is clear that rotation of gear 156 will cause holder 151 to move vertically. Suitable guide means (not shown) are provided on plate 155 and holder 151 so that the latter can travel vertically in a single plane only. A direct current motor 157 has a stationary field winding 158 and a rotatable armature 159. The armature 159 is secured to an electric clutch 160 which is adapted when energized to attract and rotate a plate 161 which is slidably mounted on a shaft to which is secured a pinion 162 meshing with gear 156. The motor 157 may be connected to lines 101 and 102 by closing switches 163 and 164, the purpose of switch 164 being to enable the reversal of the direction of rotation of the motor. Connected in series with field winding 158 is a manually adjustable resistance 165 and a resistance 166. A solenoid 167 has a movable core pivotally secured to a pivoted arm 168. The pivoted end of arm 168 is connected to resistance 165 and the other end is adapted to slide on contacts connected to various points of resistance 166. When solenoid 167 is unenergized, the arm 168 is in the position shown and all of resistance 166 is in the field circuit. When the solenoid is energized, the arm 168 moves up far enough to completely short circuit resistance 166. The energization of electric clutch 160 from source 87 is effected when normally open stationary contacts 169 are short circuited by switch blade 170 carried by movable arm 171 pivoted at 172 and having a clutch handle 173 adapted to engage either of two slots in a stationary curved segment 174. A pulley 175 driven by any suitable means is secured to a shaft 176 on which is slidably mounted the driving member of a clutch 177, the driven member of the clutch being secured to one end of screw 178 with a handle 179 secured to the other end of the screw. The driving member of clutch 177 has a circular slot in which slides a pin secured to arm 171. Shaft 176 and screw 178 are supported in suitable bearings 180. The gauge head casing 67 is slidably mounted on a rod 181 whose upper end as well as the upper end of plate 155 are internally threaded and engage screw 178 as shown. A helical compression spring 182 between a shoulder on the upper end of rod 181 and casing 67 keeps the lower end of gauging member 141 always in contact with the surface 145 of templet 144, while the spring 77 keeps gauging member 75 always in contact with projection 152. The lower end of gauging member 141 bearing against surface 145 is either hardened to resist wear or carries a wear-resisting element, such as a small diamond. The plate 155 and rod 181 are suitably guided so that they can travel in one plane only without any swinging motion about screw 178. Templet 144 may be of rectangular shape and only wide enough to accommodate the contact point of rod 141.

I will now describe the adjustment and operation of the apparatus for machining web 143. Plate 155 and rod 181 are moved to bring tool 150 and gauging member 141 to the top ends of web 143 and surface 145, respectively. The relative positions of coils 69 and 70 and armature 72 and the position of cup 100 are adjusted so that the arm 96 of micro-ammeter 94 is just ready to make contact with the mercury in this cup, and I will assume that this corresponds to an indication of 5 on the micro-ammeter. The adjustment is so made that if armature 72 moves from the adjusted position toward coil 70, the indications of the micro-ammeter will increase. Various parts of surface 145 of templet 144 may, and usually will have different angles of inclination from a horizontal axis. Assuming this to be the case, it will be necessary for the machining of web 143 to the contour of surface 145 to move tool 150 in either of the following two ways: (1) feed tool 150 toward web 143 at a constant rate, but move tool 150 horizontally at varying rates with respect to the movement of member 141 over surface 145; or (2) move member 141 and tool 150 horizontally at the same or directly proportional speeds and move tool 150 at varying rates toward web 143. For purposes of illustration, I am describing my invention in connection with apparatus adapted to move tool 150 in accordance with the second mentioned way, but I wish it clearly understood that my invention is not limited thereto. I select a suitable value of resistance 166 and adjust the value of resistance 165 so that when arm 168 does not short-circuit resistance 166 the speed of motor 157 will be slightly higher than necessary during any time in the machining operation, and when arm 168 short circuits resistance 166 the speed of motor 157 will be slightly lower than necessary during any time in the machining operation. The machining operation may now be commenced by closing switches 163 and 164 so that motor 157 runs in a direction suitable for feeding tool 150 toward web 143, and by moving handle 173 to the right to engage the right-hand slot in segment 174, thus simultaneously starting horizontal movement of rod 141 and tool 150 and energizing the electric clutch 160 to start downward movement of tool 150. At the first instant, motor 157 feeds tool 150 slightly too fast toward web 143. This causes armature 72 to move from its adjusted position toward coil 70, thereby causing arm 96 to make contact with the mercury in cup 100, and relay 105 becomes energized, thereby effecting energization of solenoid 167, causing arm 168 to short-circuit resistance 166. This decreases the speed of motor 157 so that it feeds tool 150 slightly too slow toward web 143, thus returning armature 72 to its adjusted position relative to coils 69 and 70. This causes arm 96 to break its contact with the mercury in cup 100, thereby causing de-energization of relay 105 and solenoid 167. Arm 168 drops and reinserts resistance 166 into the field circuit of motor 157, causing the latter to increase its speed. In this manner the motor speed is varied so rapidly and such slight amounts that the tool 150 is fed toward web 143 at the proper rate to give it the contour of the surface 145 of templet 144. It is clear that the same results can be obtained when machining parts in a lathe, since a boring mill is really a vertical lathe, and it should also be clear that the same results can be obtained with grinding operations instead of machining operations.

My invention has been tried out on grinding machines and has consistently given highly satisfactory results. The chief reasons why my invention is capable of producing these results are—(1) No contacts are directly operated by the gauging member in contact with the work piece, (2) the control voltage obtained from the Wheatstone bridge is segregated from the line voltage and is independent of variations in its frequency, (3) there is a large ratio between the movements of arms 96 of the micro-ammeters and armature 72 of the gauge head during the grinding operation, and, therefore, if for any reason an arm 96 makes a slightly premature contact with the mercury 97 in its cooperating cup, the resulting error in the ground diameter of shaft 19 is negligible, (4) the micro-ammeters and the relays controlled thereby may be located remote from the grinding machine where no vibration exists, thus precluding the possibility of a premature contact between an arm 96 and the mercury in its cooperating cup, (5) the large ratio between the movements of arms 96 of the micro-ammeters and armature 72 of the gauge head makes possible the adjustment of these arms so that any number of work pieces can be consecutively ground or machined to a highly accurate size or shape.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. In a machine having work holding means, a tool, and feeding mechanism for effecting a relative movement between the work holding means and the tool to cause the latter to perform an operation on the work piece carried by the holding means; the combination of a Wheatstone bridge having a coil connected in one of its arms, a movable magnetic member adjacent to said coil to function as a part of its magnetic circuit, means for moving said magnetic member in response to the relative movement between the work holding means and the tool when the latter is performing the operation on the work piece, electro responsive means on which is impressed a voltage whose magnitude is responsive to the difference of potential across the Wheatstone bridge, caused by an unbalance thereof, an electromagnet operatively associated with said feeding mechanism for effecting a change in the rate of the relative movement between the work holding means and the tool, and means responsive to the operation of said electroresponsive means for effecting the operation of said electromagnet when the work piece is at a predetermined size.

2. In a machine having work holding means, a tool, and feeding mechanism for effecting a relative movement between the work holding means and the tool to cause the latter to perform an operation on the work piece carried by the holding means; the combination of a Wheatstone bridge having two spaced apart oppositely disposed coils respectively connected in two of its arms, a movable magnetic member between the adjacent ends of said coils to function as a part of their magnetic circuits, means for moving said magnetic member in response to the relative movement between the work holding means and the tool when the latter is performing the operation on the work piece, electroresponsive means on which is impressed a voltage whose magnitude is responsive to the difference of potential across the Wheatstone bridge, caused by an unbalance thereof, an electromagnet operatively associated with said feeding mechanism for effecting a change in the rate of the relative movement between the work holding means and the tool, and means responsive to the operation of said electroresponsive means for effecting the operation of said electromagnet when the work piece is at a predetermined size.

3. In a machine having work holding means, a tool, and mechanism for effecting a relative movement between the work holding means and the tool to cause the latter to perform an operation on the work piece carried by the holding means; the combination of a Wheatstone bridge having two oppositely disposed spaced apart coils respectively connected in two of its arms, a movable magnetic armature between the adjacent ends of said coils to function as a part of their magnetic circuits, a movable gauging member moving in response to the relative movement between the work holding means and the tool when the latter is performing the operation on the work piece, means for transmitting the movement of said gauging member to said armature, a relay energized by a current whose magnitude is responsive to the difference of potential across the Wheatstone bridge, caused by an unbalance thereof, said relay having a movable arm whose position changes with variations in the magnitude of the current flowing in the relay, an electromagnet operatively associated with said feeding mechanism for effecting a change in the rate of the relative movement between the work holding means and the tool, and means responsive to a predetermined position of said movable arm for effecting the operation of said electromagnet when the work piece is at a predetermined size.

4. In a machine having work holding means, a tool, and feeding mechanism for effecting a relative movement between the work holding means and the tool to cause the latter to perform an operation on the work piece carried by the holding means; the combination of two coils, a magnetic member located adjacent to said coils to function as a part of their magnetic circuits, the said coils and magnetic member being relatively movable, means for changing the relative positions of said coils and magnetic member in response to the relative movement between the work holding means and the tool when the latter is performing the operation on the work piece, an electrical circuit on which is impressed a voltage whose magnitude changes in response to changes in the relative positions of said coils and magnetic member, electroresponsive means connected in said circuit, an electromagnet operatively associated with said feeding mechanism for effecting a change in the rate of the relative movement between the work holding means and the tool, and means responsive to the operation of said electroresponsive means for effecting the operation of said electromagnet when the work piece is at a predetermined size.

5. In a machine having work holding means, a tool, and feeding mechanism for effecting a relative movement between the work holding means and the tool to cause the latter to perform an operation on the work piece carried by the holding means; the combination of a Wheatstone bridge having a coil connected in one of its arms, a magnetic member located adjacent to said coil to function as a part of its magnetic circuit, the said coil and magnetic member being relatively movable, means for changing the relative positions of said coil and magnetic member in response to the relative movement between the work holding means and the tool when the latter is performing the operation on the work piece, electroresponsive means on which is impressed a voltage whose magnitude is responsive to the difference of potential across the Wheatstone bridge, caused by an unbalance thereof, an electromagnet operatively associated with said feeding mechanism for effecting a change in the rate of relative movement between the work holding means and the tool, and means responsive to the operation of said electroresponsive means for effecting the operation of said electromagnet when the work piece is at a predetermined size.

6. In a machine having work holding means, a tool, and feeding mechanism for effecting a relative movement between the work holding means and the tool to cause the latter to perform an operation on the work piece carried by the holding means; the combination of a Wheatstone bridge having two spaced apart oppositely disposed coils respectively connected in two of its arms, a magnetic member located adjacent to said coils to function as a part of their magnetic circuits, the said coils and magnetic member being relatively movable, means for changing the relative positions of said coils and magnetic member in response to the relative movement between the work holding means and the tool when the latter is performing the operation on the work piece, electroresponsive means on which is impressed a voltage whose magnitude is responsive to the difference of potential across the Wheatstone bridge, caused by an unbalance thereof, an electromagnet operatively associated with said feeding mechanism for effecting a change in the rate of the relative movement between the work holding means and the tool, and means responsive to the operation of said electroresponsive means for effecting the operation of said electromagnet when the work piece is at a predetermined size.

7. In a machine having work holding means, a tool, and feeding mechanism for effecting a relative movement between the work holding means and the tool to cause the latter to perform an operation on the work piece carried by the holding means; the combination of a Wheatstone bridge having a coil connected in one of its arms, a magnetic member located adjacent to said coil to function as a part of its magnetic circuit, the said coil and magnetic member being relatively movable, means for changing the relative positions of said coil and magnetic member in response to the relative movement between the work holding means and the tool when the latter is performing the operation on the work piece, electroresponsive means on which is impressed a voltage whose magnitude is responsive to the difference of potential across the Wheatstone bridge, caused by an unbalance thereof, an electromagnet operatively associated with said feeding mechanism for effecting a cessation of the relative movement between the work holding means and the tool, and means responsive to the operation of said electroresponsive means for effecting the operation of said electromagnet when the work piece is at a predetermined size.

8. In a machine having work holding means, a tool, mechanism for relatively moving the work holding means and the tool toward each other, a relatively high speed driving means and a relatively low speed driving means for operating said mechanism in a direction to cause the tool to perform an operation on the work piece carried by the holding means, the two driving means being so arranged that when both are operative the mechanism is driven by the relatively high speed driving means, and when the latter is inoperative the mechanism is driven by the relatively low speed driving means; the combination of a Wheatstone bridge having a coil connected in one of its arms, a magnetic member located adjacent to said coil to function as a part of its magnetic circuit, the said coil and magnetic member being relatively movable, means for changing the relative positions of said coil and magnetic member in response to the relative movement between the work holding means and the tool when the latter is performing the operation on the work piece, an electrical circuit energized by a current whose magnitude is responsive to the difference of potential across the Wheatstone bridge, caused by an unbalance thereof, two electromagnets operatively associated with said driving means for respectively making the high speed driving means and the low speed driving means inoperative to drive said mechanism, means responsive to a predetermined magnitude of current flow in said circuit for effecting the operation of the first of said electromagnets when the work piece is at a predetermined size, and means responsive to a different predetermined magnitude of current flow in said circuit for effecting the operation of the second of said electromagnets when the work piece is at another predetermined size.

9. In a machine having work holding means, a tool, mechanism for relatively moving the work holding means and the tool toward each other, and means for driving the mechanism in a direction to cause the tool to perform an operation on the work piece carried by said holding means; the combination of an electromagnet operatively associated with said driving means for making the latter inoperative to drive said mechanism, means for retaining the relative positions of the work holding means and the tool existing when said driving means becomes inoperative, an electromagnet operatively associated with said retaining means for making the latter inoperative to perform its above mentioned function, a Wheatstone bridge having a coil connected in one of its arms, a magnetic member located adjacent said coil to function as a part of its magnetic circuit, the said coil and magnetic member being relatively movable, means for changing the relative positions of said coil and magnetic member in response to the relative movement between the work holding means and the tool when the latter is performing the operation on the work piece, an electrical circuit energized by a current whose magnitude is responsive to the difference of potential across the Wheatstone bridge, caused by an unbalance thereof, means responsive to a predetermined magnitude of current flow in said circuit for effecting the operation of the first mentioned electromagnet when the work piece is at one predetermined size, and means responsive to a different predetermined magnitude of current flow in said circuit for effecting the operation of the second mentioned electromagnet when the work piece is at another predetermined size.

10. In a machine having work holding means, a tool, and feeding mechanism for effecting a relative movement between the work holding means and the tool to cause the latter to perform an operation on the work piece carried by the holding means; the combination of a Wheatstone bridge having a coil connected in one of its arms, a magnetic member located adjacent to said coil to function as a part of its magnetic circuit, the said coil and magnetic member being relatively movable, means for changing the relative positions of said coil and magnetic member in response to the relative movement between the work holding means and the tool when the latter is performing the operation on the work piece, electroresponsive means on which is impressed a voltage whose magnitude is responsive to the difference of potential across the Wheatstone bridge, caused by an unbalance thereof, means for effecting cessation of said relative movement between the work holding means and the tool when the work piece is at a predetermined size, means for retaining the relative positions of the work holding means and the tool existing when said cessation took place, an electromagnet operatively associated with said retaining means for making the latter inoperative to perform its above mentioned function, and means responsive to the operation of said electroresponsive means for effecting the operation of said electromagnet when the work piece is at another predetermined size.

11. In a machine having work holding means, a tool, mechanism for relatively moving the work holding means and the tool toward each other, and means for driving the mechanism in a direction to cause the tool to perform an operation on the work piece carried by said holding means; the combination of an electromagnet operatively associated with said driving means for making the latter inoperative to drive said mechanism, means for retaining the relative positions of the work holding means and the tool existing when said driving means becomes inoperative, an electromagnet operatively associated with said retaining means for making the latter inoperative to perform its above mentioned function, a Wheatstone bridge having a coil connected in one of its arms, a magnetic member located adjacent said coil to function as a part of its magnetic circuit, a second Wheatstone bridge having a coil connected in one of its arms, a magnetic member located adjacent to the last mentioned coil to function as a part of its magnetic circuit, the said coils and their respective adjacent magnetic members being relatively movable, means for changing the relative positions of each coil and its adjacent magnetic member in response to the relative movement between the work holding means and the tool when the latter is performing the operation on the work piece, electroresponsive means on which is impressed a voltage whose magnitude is responsive to the difference of potential across the first mentioned Wheatstone bridge, caused by an unbalance thereof, electroresponsive means on which is impressed a voltage whose magnitude is responsive to the difference of potential across the second mentioned Wheatstone bridge, caused by an unbalance thereof, means responsive to the operation of the first mentioned electroresponsive means for effecting the operation of the first mentioned electromagnet when the work piece is at a predetermined size, and means responsive to the operation of the second mentioned electroresponsive means for effecting the operation of the second mentioned electromagnet when the work piece is at another predetermined size.

12. In a machine having work holding means, a tool, mechanism for relatively moving the work holding means and the tool toward each other, a relatively high speed driving means and a relatively low speed driving means for operating said mechanism in a direction to cause the tool to perform an operation on the work piece carried by the holding means, the two driving means being so arranged that when both are operative the mechanism is driven by the relatively high speed driving means, and when the latter is inoperative the mechanism is driven by the relatively low speed driving means; the combination of a Wheatstone bridge having a coil connected in one of its arms, a magnetic member located adjacent to said coil to function as a part of its magnetic circuit, a second Wheatstone bridge having a coil connected in one of its arms, a magnetic member located adjacent to the last mentioned coil to function as a part of its magnetic circuit, the said coils and their respective adjacent magnetic members being relatively movable, means for changing the relative positions of each coil and its adjacent magnetic member in response to the relative movement between the work holding means and the tool when the latter is performing the operation on the work piece, electroresponsive means on which is impressed a voltage whose magnitude is responsive to the difference of potential across the first mentioned Wheatstone bridge, caused by an unbalance thereof, electroresponsive means on which is impressed a voltage whose magnitude is responsive to the difference of potential across the second mentioned Wheatstone bridge, caused by an unbalance thereof, two electromagnets operatively associated with said driving means for respectively making the high speed driving means and the low speed driving means inoperative to drive said mechanism, means responsive to the operation of the first mentioned electroresponsive means for effecting the operation of the first mentioned electromagnet when the work piece is at a predetermined size, and means responsive to the operation of the second mentioned electroresponsive means for effecting the operation of the second mentioned electromagnet when the work piece is at another predetermined size.

13. In a machine having work holding means, a tool for performing an operation on the work piece carried by the holding means, mechanism for effecting a relative transverse feeding movement between the work holding means and the tool, and mechanism for effecting a relative reciprocatory working stroke movement between the work holding means and the tool; the combination of means for gauging the work piece during the operation thereon, an electromagnet operatively associated with the first mentioned mechanism for effecting a change in the rate of said relative transverse feeding movement, two pairs of normally open contacts, an electrical circuit including said electromagnet and said contacts, the arrangement being such that the closing of both pairs of contacts effects the energization of said circuit, means responsive to the operation of said gauging means for effecting the closing of one pair of said contacts when that part of the work piece being gauged is at a predetermined size, and means for effecting the closing of the second pair of said contacts when the work holding means and the tool have been relatively reciprocated substantially to the end of a working stroke.

14. In a machine having work holding means, a tool for performing an operation on the work piece carried by the holding means, mechanism for effecting a relative transverse feeding movement between the work holding means and the tool, and mechanism for effecting a relative reciprocatory working stroke movement between the work holding means and the tool; the combination of means for effecting cessation of said relative transverse feeding movement when the work piece is at a predetermined size, means for retaining the relative positions of the work holding means and the tool existing when said cessation took place, an electromagnet operatively associated with said retaining means to make the latter inoperative to perform its above mentioned function, means for gauging the work piece during the operation thereon, two pairs of normally open contacts, an electrical circuit including said electromagnet and said contacts, the arrangement being such that the closing of both pairs of contacts effects the energization of said circuit, means responsive to the operation of said gauging means for effecting the closing of one pair of said contacts when that part of the work piece being gauged is at a predetermined size, means for effecting the closing of the second pair of said contacts when the work holding means and the tool have been relatively reciprocated substantially to the end of a working stroke, and means responsive to the energization of said circuit for short circuiting said second pair of contacts.

15. In a machine having work holding means, a tool for performing an operation on the work piece carried by the holding means, mechanism for effecting a relative transverse feeding movement between the work holding means and the tool, and mechanism for effecting a relative reciprocatory working stroke movement between the work holding means and the tool; the combination of means for gauging the work piece during the operation thereon, an electromagnet operatively associated with the first mentioned mechanism for effecting a change in the rate of said relative transverse feeding movement, two pairs of normally open contacts, an electrical circuit including said electromagnet and said contacts, the arrangement being such that the closing of both pairs of contacts effects the energization of said circuit, a relay for closing one pair of said contacts, said relay having a winding, means responsive to the operation of said gauging means for effecting the energization of said relay winding when that part of the work piece being gauged is at a predetermined size, means for effecting the closing of the second pair of said contacts when the work support and the tool have been relatively reciprocated substantially to the end of a working stroke, and a second relay having a winding connected in series with said circuit and having a pair of normally open contacts connected in parallel with said second pair of contacts.

16. In a machine having work holding means, a tool for performing an operation on the work piece carried by the holding means, machanism for effecting a relative transverse feeding movement between the work holding means and the tool, and mechanism for effecting a relative reciprocatory working stroke movement between the work holding means and the tool; the combination of means for effecting cessation of said relative transverse feeding movement when the work piece is at a predetermined size, means for retaining the relative positions of the work holding means and the tool existing when said cessation took place, an electromagnet operatively associated with said retaining means to make the latter inoperative to perform its above mentioned function, means for gauging the work piece during the operation thereon, two pairs of normally open contacts, an electrical circuit including said electromagnet and said contacts, the arrangement being such that the closing of both pairs of contacts effects the energization of said circuit, a relay for closing one pair of said contacts, said relay having a winding, means responsive to the operation of said gauging means for effecting the energization of said relay winding when that part of the work piece being gauged is at a predetermined size, means for effecting the closing of the second pair of said contacts when the work support and the tool have been relatively reciprocated substantially to the end of a working stroke, and a second relay having a winding connected in series with said circuit and having a pair of normally open contacts connected in parallel with said second pair of contacts.

17. In a grinding machine having work holding means, a grinding wheel for removing material from the work piece carried by said holding means, and a feeding mechanism for moving the grinding wheel toward and from the work piece; the combination of two electromagnets operatively associated with said feeding mechanism for controlling its rate of operation, a Wheatstone bridge having two stationary oppositely disposed spaced apart coils respectively connected in two of its arms, a second Wheatstone bridge having two stationary oppositely disposed spaced apart coils respectively connected in two of its arms, two movable magnetic armatures respectively located between the adjacent ends of said two coils of the first and second mentioned Wheatstone bridges, work sizing means having a movable gauging member in contact with the work piece, means for transmitting the movement of said gauging member to said armatures during the grinding operation, a relay energized by a current whose magnitude is responsive to the difference of potential across the first mentioned Wheatstone bridge, caused by an unbalance thereof, a second relay energized by a current whose magnitude is responsive to the difference of potential across the second mentioned Wheatstone bridge, caused by an unbalance thereof, each of said relays having a movable arm whose position changes with variations in the magnitude of the current flowing in the corresponding relay, means responsive to a predetermined position of the movable arm of the first mentioned relay for effecting the energization of one of said electromagnets when the work piece is at a predetermined size, and means responsive to a predetermined position of the movable arm of the second mentioned relay for effecting the energization of the other of said electromagnets when the work piece is at another predetermined size.

18. In a machine for reducing the size of a work piece to the size of a sample, said machine having work holding means, a reducing tool, and mechanism for effecting a relative movement between the work holding means and the tool to cause the latter to reduce the size of the work piece carried by the holding means; the combination of an electromagnet operatively associated with said feeding mechanism for controlling its rate of operation, a Wheatstone bridge having a coil connected in one of its arms, a second Wheatstone bridge having a coil connected in one of its arms, two movable magnetic members respectively located adjacent to the coils of the first and second mentioned Wheatstone bridges to act as a part of their respective magnetic circuits, a movable gauging member whose position changes in response to changes in the size of the sample, a second movable gauging member whose position changes in response to the relative movement between the work holding means and the tool, means for transmitting the movement of one gauging member to one of said magnetic members, and of the other gauging member to the other of said magnetic members, an electrical circuit on which is impressed a voltage whose magnitude is responsive to the difference of potential across the first mentioned Wheatstone bridge, caused by an unbalance thereof, a second circuit on which is impressed a voltage whose magnitude is responsive to the difference of potential across the second mentioned Wheatstone bridge, caused by an unbalance thereof, electroresponsive means, means for connecting said circuits and said electroresponsive means in series, and means responsive to the operation of said electroresponsive means for effecting the operation of said electromagnet when the work piece is at a predetermined size.

19. In a machine for reducing the size of a work piece to the size of a sample, said machine having work holding means, a reducing tool, and feeding mechanism for effecting a relative movement between the work holding means and the tool to cause the latter to reduce the size of the work piece carried by the holding means; the combination of an electromagnet operatively associated with said feeding mechanism for controlling its rate of operation, a Wheatstone bridge having a movable coil connected in one of its arms, a movable magnetic member adjacent to said coil to function as a part of its magnetic circuit, a movable gauging member whose position changes in response to changes in the size of the sample, a second movable gauging member whose position changes in response to the relative movement between the work holding means and the tool, means for transmitting the movement of one gauging member to said coil, means for transmitting the movement of the other gauging member to said magnetic member, electroresponsive means on which is impressed a voltage whose magnitude is responsive to the difference of potential across the Wheatstone bridge, caused by an unbalance thereof, and means responsive to the operation of said electroresponsive means for effecting the operation of said electromagnet when the work piece is at a predetermined size.

20. In a machine for removing material from a work piece to give it the contour of a templet, said machine having work holding means, a reducing tool, and feeding mechanism for effecting a relative transverse movement between the work holding means and the tool to cause the latter to reduce the size of the work piece carried by the holding means; the combination of an electromagnet operatively associated with said feeding mechanism for controlling its rate of operation, a Wheatstone bridge having a movable coil connected in one of its arms, a movable magnetic member adjacent to said coil to function as a part of its magnetic circuit, a movable gauging member, means for effecting two relative longitudinal movements whose velocities are substantially directly proportional to each other, one of said longitudinal movements being between the tool and the work piece surface, and the other longitudinal movement being between the gauging member and the surface of the templet to be simulated, means for transversely moving said gauging member towards and into continual contact with the templet surface, a second movable gauging member, means for transversely moving the second gauging member in response to the relative transverse movement between the work holding means and the tool, means for transmitting the transverse movement of one gauging member to said coil, means for transmitting the transverse movement of the other gauging member to said magnetic member, electroresponsive means on which is impressed a voltage whose magnitude is responsive to the difference of potential across the Wheatstone bridge, caused by an unbalance thereof, and means responsive to the operation of said electroresponsive means for effecting the operation of said electromagnet when the contour of the work piece surface varies appreciably from the contour of the templet surface.

In witness whereof, I have hereunto set my hand.

ALFRED V. MERSHON.